US007372984B2

(12) United States Patent
Dickinson et al.

(10) Patent No.: US 7,372,984 B2
(45) Date of Patent: May 13, 2008

(54) FOUR-DIMENSIONAL IMAGING OF PERIODICALLY MOVING OBJECTS VIA POST-ACQUISITION SYNCHRONIZATION OF NONGATED SLICE-SEQUENCES

(75) Inventors: Mary Dickinson, Pasadena, CA (US); Arian Farouhar, Pasadena, CA (US); Scott E. Fraser, La Canada, CA (US); Morteza Gharib, San Marino, CA (US); Michael Liebling, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 268 days.

(21) Appl. No.: 11/122,625

(22) Filed: May 5, 2005

(65) Prior Publication Data

US 2005/0259864 A1 Nov. 24, 2005

Related U.S. Application Data

(60) Provisional application No. 60/568,574, filed on May 5, 2004.

(51) Int. Cl.
*G06K 9/54* (2006.01)
*G06K 9/32* (2006.01)
(52) U.S. Cl. .................... 382/131; 382/154; 382/294
(58) Field of Classification Search ........ 382/128–132, 382/294–298, 154
See application file for complete search history.

(56) References Cited

U.S. PATENT DOCUMENTS 4,720,678 A * 1/1988 Glover et al. ............... 324/309

| 5,836,877 | A | * | 11/1998 | Zavislan | 600/407 |
|---|---|---|---|---|---|
| 5,871,019 | A | * | 2/1999 | Belohlavek | 600/450 |
| 6,009,212 | A | * | 12/1999 | Miller et al. | 382/294 |
| 6,266,453 | B1 | * | 7/2001 | Hibbard et al. | 382/294 |
| 6,611,615 | B1 | * | 8/2003 | Christensen | 382/130 |
| 2003/0016851 | A1 | * | 1/2003 | Kaufman et al. | 382/131 |
| 2003/0199750 | A1 | * | 10/2003 | Park et al. | 600/410 |

(Continued)

OTHER PUBLICATIONS

Rui, W.; Minglu, L., "An Overview of Medical Image Registration," Sep. 27-30, 2003, IEEE, Fifth International Conference on Computational Intelligence and Multimedia Applications, pp. 385-390.*

(Continued)

*Primary Examiner*—Brian Werner
*Assistant Examiner*—Anthony Mackowey
(74) *Attorney, Agent, or Firm*—Daniel L. Dawes; Myers Dawes Andras and Sherman LLP (57) ABSTRACT

When the studied motion is periodic, such as for a beating heart, it is possible to acquire successive sets of two dimensional plus time data slice-sequences at increasing depths over at least one time period which are later rearranged to recover a three dimensional time sequence. Since gating signals are either unavailable or cumbersome to acquire in microscopic organisms, the invention is a method for reconstructing volumes based solely on the information contained in the image sequences. The central part of the algorithm is a least-squares minimization of an objective criterion that depends on the similarity between the data from neighboring depths. Owing to a wavelet-based multiresolution approach, the method is robust to common confocal microscopy artifacts. The method is validated on both simulated data and in-vivo measurements.

8 Claims, 4 Drawing Sheets

U.S. PATENT DOCUMENTS

2004/0076315 A1* 4/2004 Scoll et al. ............ 382/128
2005/0201604 A1* 9/2005 Hristov .................. 382/131

OTHER PUBLICATIONS

Zimmerman, T. and F. Seigert, 4D confocal microscopy of Dictostelium discoideum morphogenesis and its presentation on the Internet, 1998, Dev. Genes Evol., pp. 411-420.*

Errington, R. J., M. D. Fricker, J. L. Wood, A. C. Hall, and N. S. White, Four dimensional imaging of living chrondocytes in cartilage using confocal microscopy: a pragmatic approach, 1997, Am. J. Physiol., pp. C1040-1051.*

Konjin, G. A., N. J. Vardaxis, M. E. Boon, L. P. Kok, D. C. Rietveld, and J. J. Schut, 4D confocal microscopy for visualization of bone remodelling, 1996, Path. Res. Prac. pp. 566-572.*

Kriete, A., and H. J. Wagner, A method for spatio temporal (4-D) data representation in confocalm microscopy: application to neuroanatomical plasticity, 1993, J. Microsc. pp. 27-31.*

Dailey, M., G. Marrs, J. Satz, M. Waite, Exploring Biological Structure and Function with Confocal Microscopy, Oct. 1999, Biol. Bull. pp. 115-122.*

* cited by examiner

FIG. 1: 005032jbo1.eps

FIG. 2: 005032jbo2.eps

FIG. 3: 005032jbo3.eps

FIG. 4: 005032jbo4.eps

FIG. 5: 005032jbo5.eps

FIG. 6: 005032jbo6.eps

FIG. 7: 005032jbo7.eps

FOUR-DIMENSIONAL IMAGING OF PERIODICALLY MOVING OBJECTS VIA POST-ACQUISITION SYNCHRONIZATION OF NONGATED SLICE-SEQUENCES

RELATED APPLICATIONS

The present application is related to U.S. Provisional Patent Application, Ser. No. 60/568,574, filed on May 5, 2004, which is incorporated herein by reference and to which priority is claimed pursuant to 35 USC 119.

BACKGROUND OF THE INVENTION

1. Field of the Invention

The invention relates to the field of confocal laser scanning microscopy (CLSM) and in particular cardiac medical imaging.

2. Description of the Prior Art

Confocal laser scanning microscopy (CLSM) has emerged as a popular method for high resolution imaging of fluorescent labels, particularly in thick or scattering samples. By placing a pinhole in the conjugate optical plane, before the detector, out-of-focus light from above and below the focal plane is rejected from the image, enhancing the axial resolution. By collecting images from defined optical slices at successive depths, the three-dimensional arrangement of fluorescently-labeled structures can be derived. In traditional point scanning confocal systems, images are collected in a pixel-by-pixel manner and acquisition speeds for sequences with frame size 512×512 pixels are on the order of only a few frames per second.

Recent advances in beam shaping, the availability of fast CCD line detectors, and the implementation of efficient hardware for data transmission have made possible the development of a fast laser scanning microscope, the LSM 5 LIVE. A blade-shaped beam focused to a line (instead of a single point for conventional CLSM) permits the parallel acquisition of a whole line of pixels and reduces the scanning dimensionality to one direction. This microscope allows for the acquisition of two dimensional image-sequences (512×512 pixels) at frame rates of up to 120 frames per second (fps). This opens new avenues for a variety of fields.

In developmental biology, one major goal is to gain a better understanding of the mechanisms that influence the development of the cardiovascular system. In particular, it is desirable to assess the influence of genetic as well as epigenetic factors such as blood flow, heart wall forces, shear stress, etc. While the frame rates of typical confocal microscopes are suitable to study many dynamic processes occurring in living systems (e.g. cell migration, division, etc.), cell motions in the cardiovascular system (e.g. heart-wall motions, blood flow, etc.) typically occur at several millimeters per second, 2-3 orders of magnitude faster than cell migration. The significant improvement in frame rate offered by parallel scanning systems now makes it possible to collect image data from single optical sections of fast-moving structures.

However, resolving rapid three-dimensional motions in real-time still remains a challenge because it is not currently possible to scan the z-direction as fast as the xy plane. Other imaging modalities such as magnetic resonance imaging (MRI), computerized tomography (CT), or ultrasound (US) suffer from similar limitations. However, if the imaged body undergoes the same deformation at regular intervals and the acquisition is always triggered at a particular phase in the cycle, it is possible to assemble the data to recover a whole volume over one full period. For larger organisms (from mice to humans), it is relatively easy to gate the acquisition with respect to electrocardiograms (ECG) or respiratory signals, a technique known as prospective gating or triggering, and reconstruct volumes at a fixed moment in the cycle. Remaining motion artifacts may then be reduced by the use of various elastic registration procedures that warp the spatial data. In cases where gating is not possible or unreliable, nongated dynamic datasets have been registered by a variety of methods and for various purposes. For instance, in nuclear medicine, noise reduction may be performed through temporal averaging of nongated signals. For example, some researchers have used the imaging data from flow-encoded MRI to retrospectively perform the gating.

Using specific modifications to conventional MRI pulse sequences, it is also possible to generate and extract a signal which varies in synchrony with the cardiac cycle for later reconstruction. For CT, various methods have been developed, either to recover an imaged volume of the heart in a defined motion state at a single time point or for four dimensional imaging, by tracking the projection's center of mass. ECG-free algorithms have also been used for US imaging.

What is needed is an apparatus and method that make it possible to reconstruct dynamic three dimensional volumes of microscopic objects that are periodically moving, using currently available CLSM technology.

BRIEF SUMMARY OF THE INVENTION

Being able to acquire, visualize and analyze three dimensional time-series, which is defined as four dimensional data, from living embryos makes it possible to understand complex dynamic movements at early stages of embryonic development. Despite recent technological breakthroughs in two dimensional dynamic imaging, confocal microscopes remain quite slow at capturing optical sections at successive depths. However, when the studied motion is periodic, such as for a beating heart, a way to circumvent this problem is to acquire, successively, sets of two dimensional-plus-time slice-sequences at increasing depths over at least one time period and later rearrange them to recover a three dimensional-plus-time sequence. In other imaging modalities at macroscopic scales, external gating signals, e.g. an electrocardiogram, have been used to achieve proper synchronization. Since gating signals are either unavailable or cumbersome to acquire in microscopic organisms, we have developed a procedure to reconstruct volumes based solely on the information contained in the image sequences. The central part of the algorithm is a least-squares minimization of an objective criterion that depends on the similarity between the data from neighboring depths. Owing to a wavelet-based multiresolution approach, our method is robust to common confocal microscopy artifacts. We validate the procedure on both simulated data and in-vivo measurements We sequentially acquire slice-sequences at different depths and reassemble them a posteriori to recover dynamic three dimensional volumes. For smaller organisms, such as the zebrafish embryos we study, reliable triggering signals to gate the acquisition are difficult and cumbersome to acquire. We have therefore devised a method for post-acquisition synchronization based upon information within the recorded nongated data itself. Our synchronization algorithm registers pairs of slice-sequences with respect to time by minimizing a least-squares intensity difference criterion.

A core element of our method is thus reminiscent of standard methods for image registration, the latter being a particular instance of the more general problem of motion estimation; however, the nature of the data requires special adjustments in order to achieve stable and repeatable results with minimal operator input.

First, since our problem naturally calls for periodic boundary conditions, we have to crop the data to cover a whole number of periods, which is implemented in an automatic manner. Second, the method must be robust to various acquisition artifacts that are specific to confocal microscopy. Last, the large amount of data that is involved imposes a subtle balance between memory and time constraints.

To solve some of the above requirements, our synchronization algorithms rely on the wavelet transform for robustness and rapid execution. The use of wavelet properties to implement affine and elastic registration algorithms of two dimensional or three dimensional datasets has been used in other methods not directly related to the methodology of the invention.

Thus, what is disclosed here is a measurement process. A synchronization algorithm, along with the tools that are required for period determination and noise reduction are disclosed. Two experiments are described in the illustrated embodiment. One based on a simulated acquisition procedure and the second based on experimental in vivo measurements. Finally, the method's overall performance as well as further anticipated development are disclosed.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 2a symbolizes the sampled intensity variation over time with unknown period T at one location x. FIG. 2b symbolizes a candidate period $T'_1$ where the samples are brought back to the first period (phase locking). The dispersion of the samples is given by the length of the curve that joins the newly ordered samples (bold curve). FIG. 2c symbolizes the situation when the candidate period corresponds to the actual period, i.e. $T'_2=T$ the dispersion of the samples, hence the length of this curve, is minimized.

FIGS. 3a-3c illustrate synchronization based on wavelet coefficients.

The reduced data is interpolated to increase synchronization accuracy.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Fluctuations in fluorescence intensities produced by regular cycles can be used to register and segment images. Any regular sequence can be used to register four-dimensional data or can be used to identify individual fluorescence particles or cells within a preparation, if images are collected with a high enough frame rate. The availability of fast scanning confocal microscopes, for instance, make it possible to collect optical sectioned data in fast temporal sequences.

For instance, the regular beat of the heart can be used to align time-lapse images taken at different focal planes. This makes it possible to collect rapid time sequences of three dimensional data. Since images taken sequentially on the same plane can be acquired more rapidly that images collected on different optical planes, time sequences can be acquired at separate optical planes and then can be registered with respect to the temporal alignment using the regular rhythm of the cardiac cycle.

Regions of interest within the image sequences themselves are used determine the frequency of the heart motion. The heart cycle can be determined using intensity fluctuations within the image, using electrical signals in the heart, using ion fluxes in the heart or by monitoring the heart sounds. This method has been used successfully to produce an accurate four-dimensional movie of the developing zebrafish heart.

This method can be extended to allowing for image registration based on the temporal frequency or phase of fluorescence or as indicated above, using other signals produced in the sample for registration of fluorescent images. For instance, different fluorescent regions of the image could repeat with different temporal frequencies or different phases. Other pixels within a sequence could be identified and classified by performing a least squares or other fit to identify matching functions.

This method could be used to identify cells that have the same ion oscillation frequency or for quantum dots that produce a fluorescence output that fluctuates at a regular frequency. The illustrated embodiment is directed to a heart in which tissues have been tagged with fluorescent markers, but the invention expressly includes within its scope a method and an apparatus for carrying out that method for any periodically or quasi-periodically moving object from which data signals at any frequency or any nature are derived.

Measurement Strategy

Figure 1:
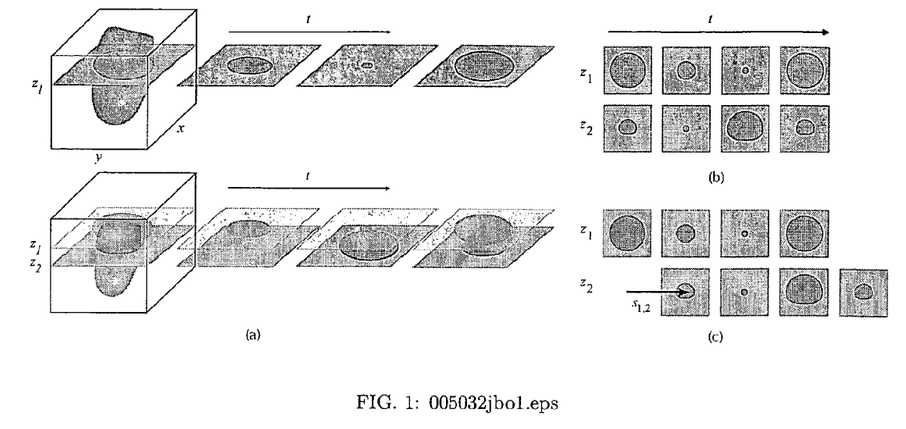
FIG. 1a is a perspective diagrammatic depiction of the heart showing two nongated slice-sequence acquisitions, one a $z_1$ and the other at $z_2$.
FIG. 1b shows two two-dimensional slice-sequences of FIG. 1a before synchronization.
FIG. 1c shows two two-dimensional slice-sequences of FIG. 1a after synchronization.

We image a slice of a three dimensional object, subject to periodic motions and deformations over typically two to four periods. We assume that the object is given by the local intensity $I(x, z, t) \in [0, I_{max}]$, with $x=(x, y)$ and that the periodic deformations are such that at any fixed spatial position $(x, z)$ we have $$|I(x, z, t) - I(x, z, t+T)| << I_{max}, \quad (1)$$

where T is the deformation period. Hereinafter, x will be used to symbolically denote the (x, y) pair of data points as will be clear from context. Between data acquisitions, the object, here the heart, is moved axially in the z direction, although only relative movement is necessary, and is sequentially imaged in its entirety as diagrammatically depicted in FIGS. 1a-1c.

Because the data acquisition is triggered at a random moment in the heart cycle, the different sequences are not synchronized. The measured intensity can be modeled by $$I_m(x, z_k, t) = \iint I(x', z, t-s_k) PSF(x-x', z-z_k) dx' dz \quad (2)$$

where the $s_k$ are the unknown time shifts, defined modulo the period, at each measured depth $z_k = kh$, $k=0, \ldots, N_z$, with h the axial slice spacing. The ideal point spread function (PSF) can be expressed by the Dirac delta function $$PSF(x, z) = \delta(x)\delta(z) \quad (3)$$

In practice, the sampling is not ideal and we assume that the PSF has a spatial extent in the z direction that is larger than the axial slice spacing h. The algorithms described below aim at finding the unknown sequence $s_k$ in order to retrieve the original volume $I(x, z, t)$ from the measurements $I_m(x, z_k, t)$.

Synchronization

The synchronization procedure is directed to the registration of slice-sequence pairs with respect to time. We seek solutions that, for a given time shift, maximize the similarity in a predetermined metric between two adjacent slices. This similarity hypothesis is reasonable if the axial sampling step h, the vertical distance between two adjacent slides, is smaller than the PSF extent in z or that the imaged object undergoes sufficiently smooth and homogeneous deformations. Indeed, while the axial resolution drops as the axial extent of the PSF increases, the similarity between two adjacent slices improves as both measurements contain information from the same physical region. For the same slice spacing, ideal sampling induces better axial resolution to the detriment of the similarity hypothesis.

While a rigorous investigation about all possible motions that may or may not be imaged using this technique could be provided, we have heuristically determined that according to the invention a unique and correct dynamic object can be recovered in the case of periodic, continuous, and homogeneous transforms even in the unfavorable case of ideal sampling. We present a simulation below that supports this observation. Deformations that are non-homogeneous with respect to the z-axis may result in incorrect reconstructions when the axial slice spacing h is too large, that is, larger than the axial extent of the PSF. In practice, such cases may only be dealt with by considering a region of interest where the deformation is known to be homogeneous or by the use of external information (ECG, etc.).

Algorithms

Consider now the synchronization methodology. The method for data processing comprises the steps of:
1. Period determination, data interpolation and cropping
2. Determination of relative shifts between pairs of slices
3. Determination of the slices' absolute shifts with respect to the first slice
4. Synchronization and post-processing.

Period Determination

Figure 2:
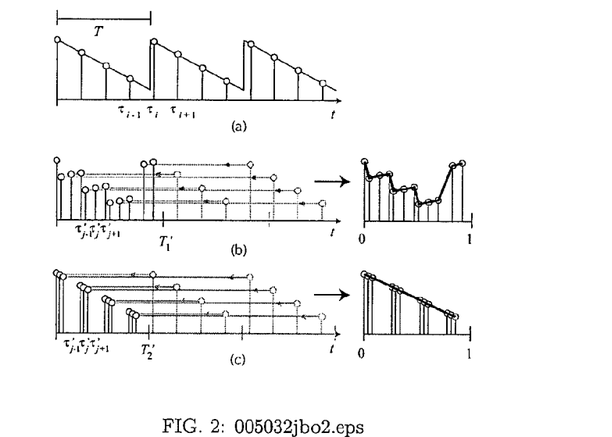
FIGS. 2a-2c are graphs illustrating the dispersion measure for period estimation.

In order to ensure proper synchronization, the heart-beat period must be known precisely and be the same for all slice-sequences at different depths. The image sequences are acquired at times, $\tau_i = ih_T$, $i=0, \ldots, N_T-1$, where $h_T$ is the acquisition sampling step and $N_T$ is the number of acquired frames. We achieved precise and automatic period determination. For a given slice-sequence and a candidate period T', the time-positions of every pixel are brought back to the first period (phase locking)

$$\tau'_i = \tau_i - [\tau_i/T']T' \quad (4)$$

and a bijective mapping $i=i(j)$ (respectively $j=j(i)$) such that $\tau_{j-1} \leq \tau_j \leq \tau_{j+1}$ is defined. An estimate of the phase-locked signal's dispersion is given by the length of the graph $(\tau_j, I_m(x, z_k, \tau_{i(j)}))_{j=0, \ldots, N_T-1}$ that joins the newly ordered samples on a normalized time scale as depicted in FIGS. 2a-2c, cumulated over the whole image, i.e.

$$D(z_k, T') = \sum_{m \in Z^2} \sum_{j=1}^{N_T-1} [|I_m(x_m, z_k, \tau_{i(j)}) - I_m(x_m, z_k, \tau_{i(j-1)})|^2 + |\tau'_j - \tau'_{j-1}|^2 / T'^2]^{\frac{1}{2}} \quad (5)$$

with $x_m = m\ h_{xy}$. Here, for simplicity, we consider that the sampling step in the Oxy plane, $h_{xy}$, is 1. The correct period $T(z_k)$ is found by minimizing the above expression, viz.

$$T(z_k) = \arg \min_T D(z_k, T') \quad (6)$$

Starting from an initial guess of the range $T(z_k) \in [T_{min}, T_{max}]$, we solve Eq. (6) iteratively using a combined parabolic and golden section search algorithm, which usually converges to a sub-sampling-step accuracy in less than ten iterations.

In order for the periodic boundary conditions in the time direction to be applied during subsequent operations, we crop and resample the data to cover an integer number of periods. We used linear spline interpolation, which offers a fair compromise between the accuracy of higher order interpolation schemes and the time efficiency of nearest neighbor interpolation. The samples are taken at times $t_i = ih_t$, $i=0, \ldots, N_t-1$, with sampling step $h_t = L/(N_t-1)$, where $N_t$ is the number of considered frames over the total time $L = N_T T$ h and $N_T$ is the number of considered periods. This also allows for temporal stretching or compression in cases where the periods at different depths are not the same. From this point onward, we consider that the measured signal $I_m(x, z_k, t)$ is known for $x \in R^2$ and $t \in [0, L)$ (possibly via the interpolation of samples that are uniformly distributed over that domain) and that periodic boundary conditions in time apply.

Determination of Relative Shifts

Our automatic synchronization algorithm is based on the minimization of an objective criterion to measure the similarity between the data from neighboring depths $z_k$ and $z_{k'}$. We have chosen a least-squares criterion that has been shown to be effective for registration algorithms $$Q_{k,k'}(s) = \int_{R^2} \int_0^L \int |I_m(x, z_k, t) - I_m(x, z_{k'}, t-s)|^2 dt dx \quad (7)$$

where the shift $s \in R$. We can further write $$Q_{k,k'}(s) = \int_{R^2} \int_0^L \int |I_m(x, z_k, t)|^2 + |I_m(x, z_{k'}, t-s)|^2 dt dx - \quad (8)$$
$$2 \int_{R^2} \int_0^L \int I_m(x, z_k, t) I_m(x, z_{k'}, t-s) dt dx$$
$$= C - 2 \int_{R^2} \int_0^L \int I_m(x, z_k, t) I_m(x, z_{k'}, t-s) dt dx$$

where the integral of the second quadratic term does not depend on s because of the periodicity with respect to time. Since the above expression has the form of a correlation and periodic boundary conditions apply, we can compute $Q_{k,k'}(s)$ (up to the constant C) for a number of regularly spaced shifts $s=ih_t$, with $h_t=L/(N_t-1)$, $i=0, \ldots, N_t-1$, at a limited cost using the Fast Fourier Transform (FFT). The relative shifts $s_{k,k'}$ between any two pairs of z-slices are obtained by finding the shifts s that minimizes $Q_{k,k'}(s)$. They may be represented by the antisymmetric matrix S, whose elements are $$s_{k,k'} = \arg \min_{s=k t, k=1, \ldots, N_t} Q_{k,k'}(s) \quad (9)$$

Note that this matrix not only includes slice-sequence pairs that are immediate neighbors but also pairs that lie farther apart. We also compute the correlation for such slices in order to reduce synchronization errors that may quickly propagate due to the sequential alignment Before we derive the method for the determination of the shifts relative to the first slice sequence, or what is defined in this specification as absolute shifts, we refine the above correlation technique to make it time and memory effective as well as robust. Indeed, computing Eqs. (8) or (5) naively would require considerable time and memory resources as the multidimensional data rapidly exceeds the storage capacity of even the latest available desktop computers. Another concern that complicates the equations' direct implementation is that the images are corrupted by noise. As a consequence, the objective functions are as well. Yet another caveat is the presence of features that are characteristic of the studied structure but do not comply with the similarity hypothesis.

For example, red blood cells are confined to the inside of the heart tube and have a movement that is in synchrony with the heart movement, however, the individual cells do not occupy the same positions from slice to slice. The correct extremum determination is thus severely affected. We have chosen to take advantage of the multiresolution and noise decorrelation properties that the wavelet decomposition offers to solve these issues.

We consider a separable orthogonal wavelet basis of $L_2(R^2)$, $$\{\psi_{j,m}^1(x), \psi_{j,m}^2(x), \psi_{j,m}^3(x)\}_{j \in Z, m \in Z^2} \quad (10)$$

where the two-dimensional wavelets $$\psi_{k,m}^p(x) = \frac{1}{2^j} \psi^p\left(\frac{x}{2^j} - m\right) \quad (11)$$

are constructed with separable products of the one dimensional scaling function ($\phi(x)$) and wavelet $\psi(x)$ $$\psi^1(x) = \phi(x)\psi(y),$$
$$\psi^2(x) = \phi(y)\psi(x),$$
$$\psi^3(x) = \psi(x)\psi(y) \quad (12)$$

For the sake of brevity, we index the basis functions with a single index k that includes the scale $j \in Z$, translation $m \in Z^2$, and wavelet type $p \in \{1, 2, 3\}$:

$$\psi_k(x) = \psi_{j,m}^p(x), \vec{k} = (p, j, m) \quad (13)$$

With this notation, we may expand an image at a fixed depth $z_k$ and time-point t in the wavelet basis as $$I_m(x, z_k, t) = \sum_{\vec{k}} c_{k,\vec{k}}(t) \psi_{\vec{k}}(x) \quad (14)$$

where the coefficients are given by the inner products (wavelet transform)

$$c_{k,\vec{k}}(t) = \langle I_m(\bullet, z_k, t), \psi_{\vec{k}} \rangle \quad (15)$$

$$= \int \int I_m(\vec{x}, z_k, t) \psi_{\vec{k}}(\vec{x}) d\vec{x} \quad (16)$$

Since the basis functions are orthogonal, i.e. $\langle \psi_k, \psi_k \rangle = \delta_{k,k'} \langle \psi_k, \psi_k \rangle = \delta_{k,k'}$, we may rewrite Eq. (8) as $$Q_{k,k'}(jh_t) = C - 2 \int_0^L \sum_{\vec{k}} c_{k,\vec{k}}(t) c_{k',\vec{k}}(t - jh_t) \quad (17)$$

$$\approx C - 2h_t \sum_{\vec{k}} \sum_{i=0}^{N_t-1} c_{k,\vec{k}}(ih_t) c_{k',\vec{k}}[(i-j)h_t]$$

Figure 3:
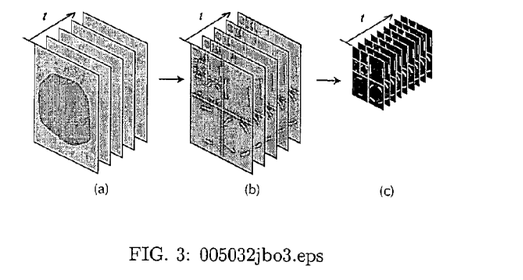
FIG. 3a shows the original slice-sequence at a given depth.
FIG. 3b show a two dimensional wavelet transform being applied to each frame.
FIG. 3c shows the fine-scale wavelet coefficients are discarded (data reduction) as well as the low-pass coefficients at the coarsest scale. A threshold is applied to the remaining coefficients to increase robustness to noise.

In practice, we only consider a finite number of scales and translations for k (because of the finite resolution and support of the image, and appropriate boundary conditions). Furthermore, we discard the fine resolution coefficients thus downsizing the data's complexity to a tractable size as symbolically represented by the diagram of FIGS. 3a-3c. Since wavelet transforms induce concise signal representations, we make sure that the most important information is still present. Also, at coarse scales, individual blood cells are not resolved. Since they are confined to the inside of the heart tube, their global position contributes to a useful correlation signal. However, since confocal images are subject to bleaching (whose consequence is the presence of a non-uniform background), we discard the low-pass coefficients that contain most of the background energy as well. We then apply a soft threshold to the remaining coefficients to limit the influence of other noise sources.

Similarly, we may apply Eq. (5) to the reduced data set of wavelet coefficients instead of the sampled image pixels, i.e.

$$\tilde{D}(z_k, T') = \sum_{\vec{k}} \sum_{i=0}^{N_t-1} \left\{ \left| c_{k,\vec{k}}[\tau_{i(j)}] - c_{k,\vec{k}}[\tau_{i(j-1)}] \right|^2 + |\tau'_j - \tau'_{j-1}|^2 / T'^2 \right\}^{\frac{1}{2}} \quad (18)$$

thus gaining robustness, reducing the required memory, and decreasing the computation time. Although Eqs. (5) and (18) are not formally equivalent, the latter may be compared to applying the former to a sequence of images whose main features (edges) have been enhanced. Indeed, the wavelet transform essentially acts as an oriented differential operator at multiple scales.

We did not notice significant differences in the overall behavior of the algorithm depending on the choice of the wavelet basis, which must, however, be orthogonal to ensure validity of Eq. (17). We chose to work with the Daubechies 9/7 wavelets. Although they are not orthogonal but are nearly orthogonal, they have good approximation properties and are symmetric. The latter property allows the implementation of an algorithm which does not require that the image-size be a multiple of a power-of-two and which is thus well-suited for region-of-interest processing.

Finally, to increase the synchronization accuracy, we linearly interpolate the processed wavelet coefficients with respect to time in order to obtain a finer time-step when computing Eq. (17). This. interpolation is fast since the amount of data is reduced.

Absolute Shifts Determination

To determine the slice-sequences' shifts with respect to the uppermost sequence (absolute shifts) $s_k$, we consider their relation to the relative shifts $s_{k,k'}$.

$s_1=0$ $$s_k - s_{k'} = s_{k,k'} \text{ with } k,k=1, \ldots, N_z \text{ and } k<k' \quad (19)$$

Since slice-sequence pairs that are separated by a larger depth are less trustworthy, we assign different weights $w_{|k'-k|}$ $w_{|k'-k|}$ to equations that involve the estimated shifts $s_{k,k'}$ depending on the distance j=|k'−k|. We set lower weights $w_j$ equations for slice pairs less likely to exhibit similarities, that is when the distance |k'−k| between them increases. For a system with $N_z=5$ and $w_j=0$ for j>2, we can rewrite Eqn (19) in matrix form $$\begin{bmatrix} 1 & 0 & 0 & 0 & 0 \\ 1 & -1 & 0 & 0 & 0 \\ 0 & 1 & -1 & 0 & 0 \\ 0 & 0 & 1 & -1 & 0 \\ 0 & 0 & 0 & 1 & -1 \\ 1 & 0 & -1 & 0 & 0 \\ 0 & 1 & 0 & -1 & 0 \\ 0 & 0 & 1 & 0 & -1 \end{bmatrix} \begin{pmatrix} s_1 \\ s_2 \\ s_3 \\ s_4 \\ s_5 \end{pmatrix} = \begin{bmatrix} 0 \\ s_{1,2} \\ s_{2,3} \\ s_{3,4} \\ s_{4,5} \\ s_{1,3} \\ s_{2,4} \\ s_{3,5} \end{bmatrix} \quad (20)$$

where equation 20 is also expressed in matrix algebraic form as At=s along with the diagonal weighting matrix $$W = diag(1, w_1, w_1, w_1, w_1, w_2, w_2, w_2) \quad (21).$$

We determine the weighted least-squares solution of Eq. (20), which is equivalent to solving $$A^\dagger W^\dagger W A t = A^\dagger W^\dagger W s \quad (22)$$

where (■) $^\dagger$ denotes transposition. Eq. (20) may easily be modified to include supplementary information (not image-intrinsic) that may become available in the future, such as electrocardiograms (ECG). Depending on the accuracy of the signals, we may then set appropriate weights in Eq. (21).

Synchronization and Post-processing

The original slice-sequences are finally circularly shifted by the computed absolute shifts (using linear interpolation and re-sampling). The synchronized data may then be visualized using four dimensional-capable software packages. Noise reduction steps may be applied. We made use of a conventional rolling-ball background removal algorithm to normalize the background. The four dimensional data series may also be analyzed to follow individual cell movements. The higher dimensionality of the data should also make it possible to take advantage of more sophisticated conventional noise removal algorithms that have proven to be effective for other high-dimensional modalities. Finally, the synchronized data might be suitable for subsequent deconvolution.

Simulation

We validate our approach by simulating the acquisition procedure on a periodically deformed test-body. We have considered the following, much simplified, heart-tube phantom. At time t=0, the contributing intensity at every location (x, z) is given by $$I(x,,z,0) = I_0 \beta^3 \left( \frac{(x^2+y^2) - r_0(z)}{w/4} \right) (1 + \gamma \cos(2\pi f_d x)\cos(2\pi f_d y)\cos(2\pi f_d z))$$

where the central wall-radius is given by $$r_0(t, z) = R_0 + \Delta_R \sin(2\pi \alpha z) \quad (24)$$

where w is the wall thickness, α controls the tube's geometry, $R_0$ is the average tube radius, ΔR is the radius movement amplitude, γ is the amplitude of a regular pattern of frequency $f_d$, and the cubic B-spline is given by $$\beta^3(x) = \begin{cases} 2/3 - |x|^2 + |x|^3/2, & 0 \le |x| < 1 \\ (2-|x|)^3/6, & 1 \le |x| < 2 \\ 0 & 2 \le |x| \end{cases} \quad (25)$$

Typical heart motions include rotation, expansion, contraction, and shear. We model the intensity at subsequent times by a general periodic affine transformation of the coordinate system corresponding to a homogeneous deformation of the original body. The intensity at position (x, y, z) and time t, is given by $$I(x,z,t) = I(x', z', 0) \quad (26)$$

where, using homogeneous coordinates $$\begin{pmatrix} x' \\ y' \\ z' \\ 1 \end{pmatrix} = \begin{pmatrix} a_{11}(t) & a_{12}(t) & a_{13}(t) & a_{14}(t) \\ a_{21}(t) & a_{22}(t) & a_{23}(t) & a_{24}(t) \\ a_{31}(t) & a_{32}(t) & a_{33}(t) & a_{34}(t) \\ 0 & 0 & 0 & 1 \end{pmatrix} \begin{pmatrix} x \\ y \\ z \\ 1 \end{pmatrix} \quad (27)$$

$$\begin{pmatrix} x' \\ y' \\ z' \\ 1 \end{pmatrix} = \begin{pmatrix} a_{11}(t) & a_{12}(t) & a_{13}(t) & a_{14}(t) \\ a_{21}(t) & a_{22}(t) & a_{23}(t) & a_{24}(t) \\ a_{31}(t) & a_{32}(t) & a_{33}(t) & a_{34}(t) \\ 0 & 0 & 0 & 1 \end{pmatrix} \begin{pmatrix} x \\ y \\ z \\ 1 \end{pmatrix}$$

Figure 4:
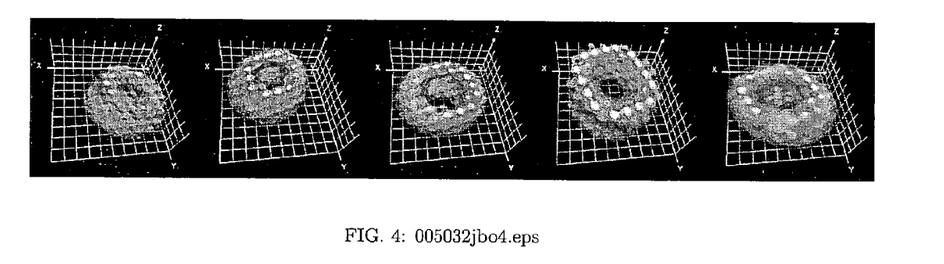
FIG. 4 depicts five time-points of a simulated heart-tube deformation cycle (homogeneous transform).

The time-periodic affine transformation matrix A(t) can be decomposed as a combination of translation, rotation, scaling and shear $$A(t)=T(t)R(t)H(t)C(t) \quad (28)$$

where T(t), R(t), H(t), and C(t) are the matrices corresponding to the respective transformations. Twelve parameters control the deformation matrix and each of them is a periodic function of time, which we specify through the coefficients of its Fourier series. The latter may be chosen randomly to cover the full range of possible transformations. In FIG. 4, we show several time-points of such a random, periodic, and continuous deformation cycle that includes shear, rotation, translation, and scaling.

The transformation matrix in Eq. (28) can be decomposed using the following matrices for scaling $$C(t) = \begin{pmatrix} S_x(t) & 0 & 0 & 0 \\ 0 & S_y(t) & 0 & 0 \\ 0 & 0 & S_z(t) & 0 \\ 0 & 0 & 0 & 1 \end{pmatrix}$$

translation $$T(t) = \begin{pmatrix} 1 & 0 & 0 & T_x(t) \\ 0 & 1 & 0 & T_y(t) \\ 0 & 0 & 1 & T_z(t) \\ 0 & 0 & 0 & 1 \end{pmatrix}$$

shear and $$H(t) = \begin{pmatrix} 1 & S_{xy}(t) & S_{xz}(t) & 0 \\ 0 & 1 & S_{yz}(t) & 0 \\ 0 & 0 & 1 & 0 \\ 0 & 0 & 0 & 1 \end{pmatrix}$$

rotation $$R(t) = \begin{pmatrix} \cos(\psi(t)) & \sin(\psi(t)) & 0 & 0 \\ -\sin(\psi(t)) & \sin(\psi(t)) & 0 & 0 \\ 0 & 0 & 1 & 0 \\ 0 & 0 & 0 & 1 \end{pmatrix}$$

-continued $$\begin{pmatrix} 1 & 0 & 0 & 0 \\ 0 & \cos(\theta(t)) & \sin(\theta(t)) & 0 \\ 0 & -\sin(\theta(t)) & \sin(\theta(t)) & 0 \\ 0 & 0 & 0 & 1 \end{pmatrix} \begin{pmatrix} \cos(\phi(t)) & \sin(\phi(t)) & 0 & 0 \\ -\sin(\phi(t)) & \sin(\phi(t)) & 0 & 0 \\ 0 & 0 & 1 & 0 \\ 0 & 0 & 0 & 1 \end{pmatrix}$$

where the twelve coefficients $$\theta(t)=(\theta_1(t),\ldots,\theta_{12}(t))=(\phi(t),\theta(t),\psi(t),S_x(t),S_y(t),S_z(t),\\ S_{xy}(t),S_{xz}(t),S_{yz}(t),T_x(t),T_y(t),T_z(t))$$

are periodic functions that can conveniently be expressed by their Fourier series $$\theta_i(t) = a_{0i} + \sum_{k=1}^{\infty} a_{ki}\cos(2\pi(k/T)t) + \sum_{k=1}^{\infty} b_{ki}\sin(2\pi(k/T)t)$$

$i = 1, \ldots, 12$

To assess the performance of our method, we generated a set of 100 deformation cycles using at each time different (normally distributed) random variables for the second and third harmonics of each parameter function, as well as random shifts $\bar{s}_k \sim \text{Un}(-T,T)\bar{s}_k \sim \text{Un}(-T,T)$ (uniform probability distribution). We considered the simplified PSF of Eq. (3) with $N_z=20$, $N_t=40$, $h_T=1$ (normalized time units), and a period T=19.5. From these simulated measurements, we then applied our algorithm (using 80 time-points to compute the correlations, that is, after the cropping step, approximately 2 times oversampling) to retrieve the shifts $s_k$. Since the true absolute shifts were known, we could compute the absolute error using the following formula (that takes into account periodicity, e.g. comparing shifts $s_1=\delta$ and $s_2=T-\delta$ yields an error $\epsilon=2\delta$)

$$\epsilon=\min(|W_T(\bar{s}_k)-W_T(s_k)|,T-|W_T(\bar{s}_k)-W_T(s_k)|) \quad (29)$$

where $W_T(x)=x-[x/T]T$. The mean error over the 100 experiments was $\bar{\epsilon}=0.31 \pm 0.08$ frames. This result confirms that for the vast class of periodic homogeneous transforms our method is highly reliable, even when the considered sampling is ideal, i.e. when there is no axial overlap of the PSF. The error may be reduced by linearly interpolating the wavelet coefficients at a finer sampling rate in time. For different oversampling rates, we obtained the following errors: $\bar{\epsilon}_{1x}=0.41\pm0.12$, $\bar{\epsilon}_{2x}=0.31\pm0.08$, $\bar{\epsilon}_{4x}=0.27\pm0.06$, $\bar{\epsilon}_{8x}=0.25\pm0.06$. However, visual inspection of the reconstructions from in vivo measurements showed no significant improvement of the results above 2× oversampling. Also, although the accuracy of correlation-based registration methods is known to be inherently limited, in practice, the current limiting factors are the irregularities in the heartbeat periodicity of the biological samples themselves.

EXPERIMENTAL MEASUREMENTS

Figure 5:
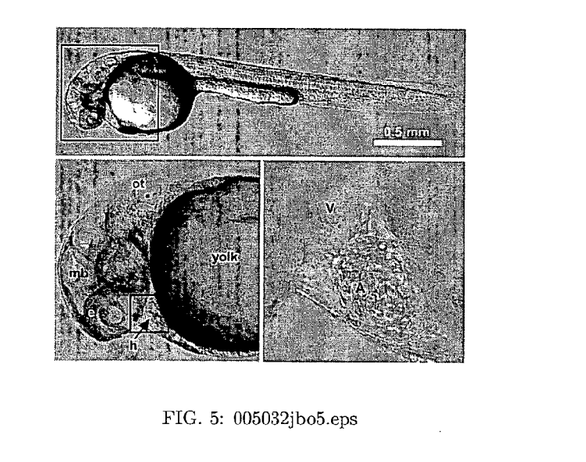
FIGS. 5a-5c are bright-field photographic images with increasing magnification of a zebrafish embryo at 48 h.p.f. where h=heart; e=eye; mb=midbrain; ot=otocyst; yolk=yolk mass; A=atrium; V=ventricle are visible.

With the aim of a better understanding of the zebrafish cardiac development, we applied our method to a slice-sequence from an early embryonic, 48 h.p.f. (hours post fertilization), beating heart. In FIG. 5, we show a bright-field microscopy image of a 48 h.p.f. zebrafish embryo where the heart position has been indicated. The study focuses on zebrafish for several reasons: they are vertebrates that reproduce externally and rapidly, they are relatively transparent, and it is possible to genetically engineer fish strains that express vital fluorescent markers in specific tissues (for instance, heart wall, or blood cells). Here, we have chosen to study gata1::GFP labeled zebrafish embryos whose endo- and myocardial cells as well as erythrocytes are fluorescent. The embryos were anesthetized in order to limit the imaged movements to those of the heart. Images were acquired using a Zeiss LSM 5 LIVE laser scanning microscope prototype at a frame-rate of 151 Hz for the duration of 3-4 heartbeats. The images had 256×256 pixels and a sampling step of 0.9 µm per pixel (40× AchroPlan water-immersion lens NA=0.8). The stage was then moved axially in increments of 5 µm before a new sequence was acquired. A total of about 20 positions could be imaged per embryo.

Figure 6:
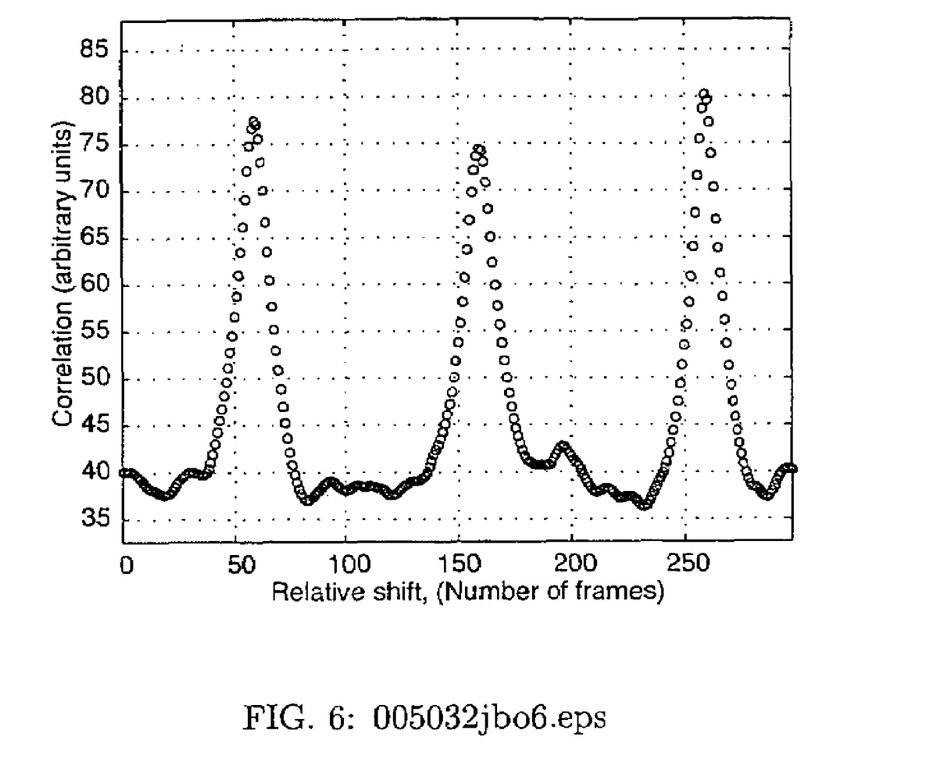
FIG. 6 is a graph of an experimental correlation curve for two adjacent slice-sequences. The maximum correlation occurs for a shift of 259 frames.

The heart-beat of the studied zebrafish appeared to remain steady over the usual acquisition time for one slice (3-4 heartbeats). However, we observed changes in the rate of up to several percent between the sequence at the first and last z-position. Once identified, these variations, mainly due to ambient temperature changes, could subsequently be controlled to limit the period change. We considered three periods per slice-sequence. In FIG. 6, we show the experimental correlation curve for one slice-sequence pair. The curve's three main maxima correspond to admissible periodic shifts (one peak shift per imaged heartbeat).

Figure 7:
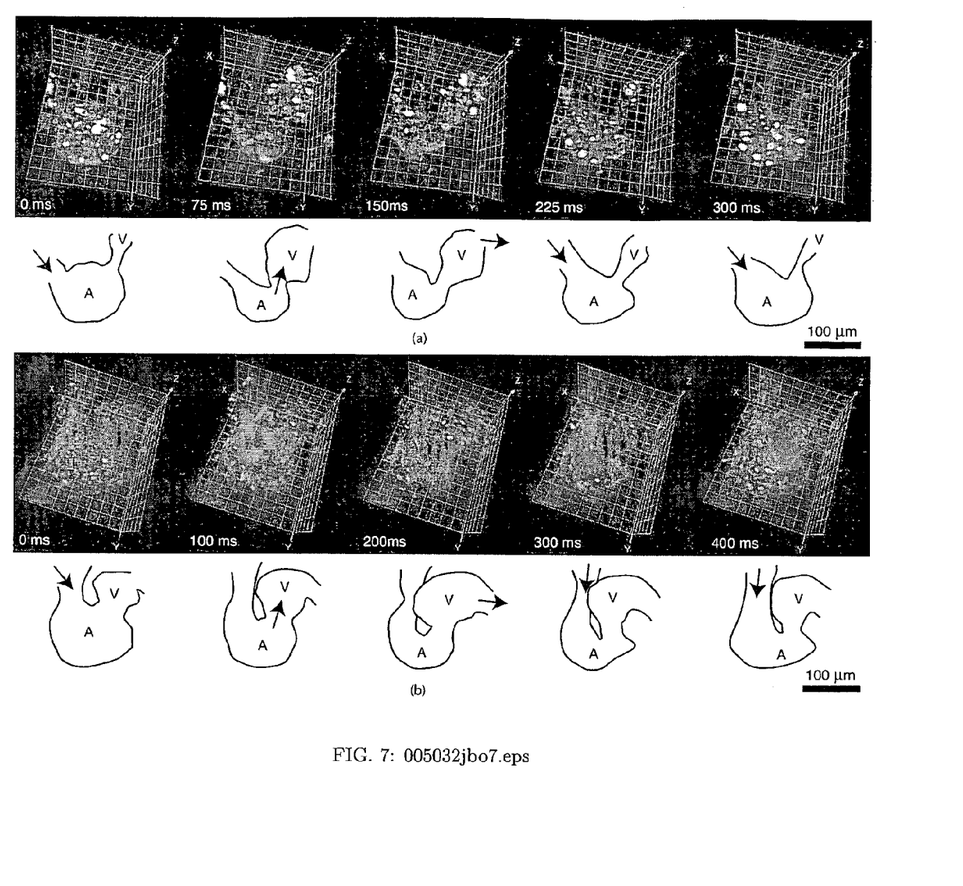
FIGS. 7a-7b are reconstructed four dimensional datasets or frames of beating 48 h.p.f. gata1::GFP zebrafish hearts with a line drawing of the outline of the heart for each frame. In the first frame, the red blood cells fill the atrium. In the following frames, the red blood cells are pumped through the atrial ventricular canal into the ventricle. The atrium fills again while the cycle is completed. The grid spacing is 20 μm.

In FIG. 7, we show the rendering over 5 frames of two reconstructed embryo hearts. Mostly erythrocytes, but also endo- and myocardial cells are fluorescent and visible. The orientation with respect to the z-axis is different for the two samples, yet the reconstructions show similar features, which supports the hypothesis that the method is suitable for accurate imaging of the wall deformations. These reconstructed images allow the visualization of complex flow and wall movement patterns that previously could not be studied. The computation time on a 2 GHz PowerPC G5, for a set of 20 slices-sequences of size 256×256 pixels and 220 time frames, is distributed as follows. Preprocessing (wavelet transform) was 1 minute; period retrieval was 10 s; time-interpolation, re-sampling of wavelet coefficients and FFT was 7 s; shift determination was 7 s (absolute shift determination takes less than 0.01 s); and original data shifting, interpolation and sampling was 40 s. Finally, our implementation's memory requirements (RAM) are below 512 MB for the above dataset.

Thus what is disclosed is a procedure for the synchronization of nongated confocal slice sequences to build dynamic three dimensional volumes. We have investigated the ability of our method to achieve this goal and found that it performs well. We have validated the approach both through simulation and in vivo measurements. The described algorithms appear to be robust and lead to coherent results. Provisions are made in the method for the subsequent inclusion of a priori data to relieve the current requirements on the movements that can be studied with this technique.

Many alterations and modifications may be made by those having ordinary skill in the art without departing from the spirit and scope of the invention. For example, Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for synchronizing nongated confocal data slice sequences to generate dynamic three dimensional volumes comprising:

sequentially acquiring confocal slice-sequences at different depths; and reassembling the confocal slice-sequences at different depths in synchronization with each other without the use of a gating signal to recover a dynamic three dimensional volume where reassembling the slice-sequences at different depths in synchronization with each other without the use of a gating signal to recover a dynamic three dimensional volume comprises registering slice-sequence pairs with respect to time for a given time shift in a manner to maximize similarity in a predetermined metric between two temporally adjacent slices, where registering slice-sequence pairs with respect to time for a given time shift in a manner to maximize similarity in a predetermined metric between two temporally adjacent slices comprises measuring data intensity, $I_m$, at each point, x, z, $$I_m(x,z_k,t) = \int \int \int I(x',z,t-s_k) PSF(x-x',z-z_k) dx' dz$$

where t is time, the $s_k$ are the unknown time shifts, defined modulo a predetermined period, at each measured depth $z_k=kh$, $k=0,\ldots,N_z$, with h the axial slice spacing, PSF is a point spread function (PSF) expressed by the Dirac delta function $$PSF(x, z)=\delta(x)\delta(z)$$

and where the axial slice spacing h, the vertical distance between two adjacent slides, is smaller than the PSF extent in z, or where the imaged object undergoes sufficiently smooth and homogeneous deformations to provide statistically significant similarity between adjacent slides.

2. A method for synchronizing nongated confocal data slice sequences to generate dynamic three dimensional volumes comprising:
sequentially acquiring confocal slice-sequences at different depths; and
reassembling the confocal slice-sequences at different depths in synchronization with each other without the use of a gating signal to recover a dynamic three dimensional volume,
where reassembling the slice-sequences at different depths in synchronization with each other without the use of a gating signal to recover a dynamic three dimensional volume comprises:
determining a period of the object motion;
cropping data in the acquired slice-sequences;
interpolating data in the cropped slice-sequences;
determining relative shifts between pairs of slice-sequences;
determining absolute shifts between pairs of slice-sequences with respect to
a first slice-sequence;
synchronizing slice-sequences according to the absolute shifts; and post-processing the synchronized slice-sequences
where determining a period of the object motion comprises selecting a period in the range $T(z_k) \in [T_{min}, T_{max}]$, and determining a period $T(z_k)$ by iteratively minimizing $$T(z_k)=\arg\min_{T'} D(z_k, T')$$

where image sequences are acquired at times, $T_i = ih_T$, $i=0,\ldots,N_T-1$, where $h_t$ is the acquisition sampling step and $N_T$ is the number of acquired frames, where for a selected period T', the time-positions of every pixel are phase locked to the first period $$\tau'_i = \tau_i - \lfloor \tau_i/T' \rfloor T'$$

where a bijective mapping $i=i(j)$ (respectively $j=j(i)$) such that $\tau'_{j-1} \leq \tau'_j \leq \tau'_{j+1}$ is defined, and where an estimate of dispersion of a phase locked signal, D, is given by the length of a graph $(\tau'_j, I_m(x, z_k, \tau_{i(j)}))_{j=0,\ldots,N_T}$ that joins the newly ordered samples on a normalized time scale cumulated over the whole image, where $$D(zk, T') = \sum_{m \in Z^2} \sum_{j=1}^{N_T-1} [|I_m(x_m, z_k, \tau_{i(j)}) - I_m(x_m, z_k, \tau_{i(j-1)})|^2 + |\tau'_j - \tau'_{j-1}|^2/T'^2]^{\frac{1}{2}}$$

with $x_m = m\, h_{xy}$.

3. A method for synchronizing nongated confocal data slice sequences to generate dynamic three dimensional volumes comprising:
sequentially acquiring confocal slice-sequences at different depths; and
reassembling the confocal slice-sequences at different depths in synchronization with each other without the use of a gating signal to recover a dynamic three dimensional volume,
where reassembling the slice-sequences at different depths in synchronization with each other without the use of a gating signal to recover a dynamic three dimensional volume comprises:
determining a period of the object motion;
cropping data in the acquired slice-sequence;
interpolating data in the cropped slice-sequences;
determining relative shifts between pairs of slice-sequences;
determining absolute shifts between pairs of slice-sequences with respect to
a first slice-sequence;
synchronizing slice-sequences according to the absolute shifts; and post-processing the synchronized slice-sequences
where interpolating data in the acquired slice-sequences comprises resampling the cropped data to cover an integer number of periods, where the resampled data are taken at times $t_i=ih_t$, $i=0,\ldots,N_t-1$, with sampling step $h_t=L/N_t-1$), where $N_t$ is the number of considered frames over the total time $L=N_T T$ h and $N_T$ is the number of considered periods, and using a linear spline interpolation.

4. A method for synchronizing nongated confocal data slice sequences to generate dynamic three dimensional volumes comprising:
sequentially acquiring confocal slice-sequences at different depths; and
reassembling the confocal slice-sequences at different depths in synchronization with each other without the use of a gating signal to recover a dynamic three dimensional volume,
where reassembling the slice-sequences at different depths in synchronization with each other without the use of a gating signal to recover a dynamic three dimensional volume comprises:
determining a period of the object motion;
cropping data in the acquired slice-sequence;
interpolating data in the cropped slice-sequences;
determining relative shifts between pairs of slice-sequences;
determining absolute shifts between pairs of slice-sequences with respect to
a first slice-sequence;
synchronizing slice-sequences according to the absolute shifts; and post-processing the synchronized slice-sequences
where determining relative shifts between pairs of slice-sequences comprises using a least-squares criterion defined by $$Q_{k,k'}(s) = \int\int_{R^2} \int_0^L |I_m(x, z_k, t) - I_m(x, z_{k'}, t-s)|^2 \, dt\, dx$$

where the shift $s \in R$, where $$Q_{k,k'}(s) = \int\int_{R^2} \int_0^L |I_m(x, z_k, t)|^2 + |I_m(x, z_{k'}, t-s)|^2 \, dt\, dx -$$

-continued $$2 \iint_{R^2} \int_0^L I_m(x, z_k, t) I_m(x, z_{k'}, t-s) dt dx$$

$$= C - 2 \iint_{R^2} \int_0^L I_m(x, z_k, t) I_m(x, z_{k'}, t-s) dt dx;$$

computing $Q_{k,k'}(s)$ up to the constant C for a number of regularly spaced shifts $s=ih_t$, with $h_t=L/(N_t-1)$, $i=0, \ldots, N_t-1$, to obtain the relative shifts $s_{k,k'}$ between any two pairs of z-slices by finding the shifts s that minimizes $Q_{k,k'}(s)$, which relative shifts are represented by the antisymmetric matrix S, whose elements are $$s_{k,k'} = \arg\min_{s=kt, k=1, \ldots, N_t} Q_{k,k'}(s).$$

5. The method of claim 4 determining relative shifts between pairs of slice-sequences comprises using a least-squares criterion comprises using multiresolution and noise decorrelation properties of wavelet decomposition using a separable orthogonal wavelet basis of $L_2(R^2)$, $$\{\psi_{j,m}^1(x), \psi_{j,m}^2(x), \psi_{j,m}^3(x)\}_{j \in Z, m \in Z^2} \quad (10)$$

where the two-dimensional wavelets $$\psi_{k,m}^p(x) = \frac{1}{2^j} \psi^p\left(\frac{x}{2^j} - m\right)$$

are constructed with separable the one dimensional scaling function $\phi(x)$ and wavelet $\psi(x)$ $$\psi^1(x) = \phi(x)\psi(y),$$

$$\psi^2(x) = \phi(y)\psi(x),$$

$$\psi^3(x) = \psi(x)\psi(y)$$

where the basis functions are indexed with a single index k that includes the scale $j \in Z$, translation $m \in Z^2$, and wavelet type $p \in \{1, 2, 3\}$:

$$\psi_k(x) = \psi_{j,m}^p(x), \vec{k}=(p, j, m)$$

to expand the slice-sequence at a fixed depth $z_k$ and time-point t in the wavelet basis as $$I_m(x, z_k, t) = \sum_{\vec{k}} c_{k,\vec{k}}(t) \psi_{\vec{k}}(x)$$

where the coefficients are given by the inner products (wavelet transform)

$$c_{k,\vec{k}}(t) = \langle I_m(\square, z_k, t), \psi_{\vec{k}} \rangle = \iint I_m(\vec{x}, z_k, t) \psi_{\vec{k}}(\vec{x}) dx$$

and since the basis functions are orthogonal, i.e. $\langle \psi_{\vec{k}}, \psi_{\vec{k}'} \rangle = \delta_{k,k'} \langle \psi_k, \psi_k \rangle = \delta_{k,k'}$, $$Q_{k,k'}(jh_t) = C - 2 \int_0^L \sum_{\vec{k}} c_{k,\vec{k}}(t) c_{k',\vec{k}}(t - jh_t)$$

-continued $$\approx C - 2h_t \sum_{\vec{k}} \sum_{i=0}^{N_t-1} c_{k,\vec{k}}(ih_t) c_{k',\vec{k}}[(i-j)h_t]$$

where only a finite number of scales and translations for k are considered because of the finite resolution and support of the image, and appropriate boundary conditions, where the fine resolution coefficients are discarded to downsize the data complexity, where the low-pass coefficients are discarded, where a soft threshold is applied to the remaining coefficients to limit the influence of noise sources, where $D(z_k, T')$ is derived from a reduced data set of wavelet coefficients instead of sampled image pixels, $I_m$, using $$\tilde{D}(z_k, T') = \sum_{\vec{k}} \sum_{j=1}^{N_t-1} \left\{ \left| c_{k,\vec{k}}[\tau_{i(j)}] - c_{k,\vec{k}}[\tau_{i(j-1)}] \right|^2 + |\tau'_j - \tau'_{j-1}|^2 / T'^2 \right\}^{\frac{1}{2}}$$

thus gaining robustness, reducing required memory and decreasing computation time.

6. The method of claim 5 where using a separable orthogonal wavelet basis of $L_2(R^2)$ comprises using Daubechies 9/7 wavelets.

7. A method for synchronizing nongated confocal data slice sequences to generate dynamic three dimensional volumes comprising:
sequentially acquiring confocal slice-sequences at different depths; and
reassembling the confocal slice-sequences at different depths in synchronization with each other without the use of a gating signal to recover a dynamic three dimensional volume,
where reassembling the slice-sequences at different depths in synchronization with each other without the use of a gating signal to recover a dynamic three dimensional volume comprises:
determining a period of the object motion;
cropping data in the acquired slice-sequences;
interpolating data in the cropped slice-sequences;
determining relative shifts between pairs of slice-sequences;
determining absolute shifts between pairs of slice-sequences with respect to
a first slice-sequence;
synchronizing slice-sequences according to the absolute shifts; and post-processing the synchronized slice-sequences
where determining absolute shifts between pairs of slice-sequences with respect to a first slice-sequence comprises determining the absolute shifts in relation to the relative shifts $s_{k,k'}$, by setting $$s_1 = 0$$

$$s_k - s_{k'} = s_{k,k'} \text{ with } k,k=1, \ldots, N_z \text{ and } k<k';$$

assigning different weights $w_{|k'-k|}$ $w_{|k'-k|}$ to equations that involve the estimated shifts $s_{k,k'}$ depending on the distance $j=|k'-k|$, lower weights $w_j$ being assigned to equations for slice-sequence pairs less likely to exhibit similarities, namely when the distance $|k'-k|$ between the slice-sequence pairs increases as summarized in matrix algebraic form as A t=s along with the diagonal weighting matrix, where A is an assignment matrix, t an absolute shift matrix and s a relative shift matrix along with a diagonal weighting matrix, $W=\text{diag}(1, w_1, w_1, w_1, w_1, w_2, w_2, w_2)$; and determining a weighted least-squares solution of $A\,t=s$ by solving $A^\dagger W^\dagger W A t = A^\dagger W^\dagger W s$, where $(\blacksquare)^\dagger$ denotes transposition.

8. The method of claim 7 further comprising setting appropriate weights in $W=\text{diag}(1, w_1, w_1, w_1, w_1, w_2, w_2, w_2)$ to include supplementary information which is not image-intrinsic, such as electrocardiograms (ECG).

* * * * *

UNITED STATES PATENT AND TRADEMARK OFFICE
CERTIFICATE OF CORRECTION

| | | |
|---|---|---|
| PATENT NO. | : 7,372,984 B2 | |
| APPLICATION NO. | : 11/122625 | |
| DATED | : May 13, 2008 | |
| INVENTOR(S) | : Mary Dickinson et al. | |

It is certified that error appears in the above-identified patent and that said Letters Patent is hereby corrected as shown below:

In column 1, line 5, please enter the following paragraph:

"Statement of Government Support
     This invention was made with government support under Grant No. HL078694 awarded by National Institutes of Health. The government has certain rights in the invention."

Signed and Sealed this
Twenty-eighth Day of December, 2010

David J. Kappos
*Director of the United States Patent and Trademark Office*